US006676317B2

(12) United States Patent
Ozaki

(10) Patent No.: US 6,676,317 B2
(45) Date of Patent: Jan. 13, 2004

(54) ROTOR BALANCING STRUCTURE, SHEET MATERIAL PROCESSING DEVICE, AND IMAGE FORMING DEVICE

(75) Inventor: Takao Ozaki, Kanagawa (JP)

(73) Assignee: Fuji photo Film Co., Ltd., Kanagawa (JP)

( * ) Notice: Subject to any disclaimer, the term of this patent is extended or adjusted under 35 U.S.C. 154(b) by 521 days.

(21) Appl. No.: 09/774,575

(22) Filed: Feb. 1, 2001

(65) Prior Publication Data

US 2001/0010192 A1 Aug. 2, 2001

(30) Foreign Application Priority Data

Feb. 2, 2000 (JP) ....................................... 2000-025326

(51) Int. Cl.[7] ................................................ G01M 1/02

(52) U.S. Cl. ......................... 400/636.3; 101/375; 73/66; 73/460; 73/461; 73/469

(58) Field of Search ............................ 73/460, 66, 469, 73/461; 347/139, 262; 400/719, 636.3; 101/494, 375; 702/173, 101

(56) References Cited

U.S. PATENT DOCUMENTS 4,716,761 A * 1/1988 Ito et al. .................... 73/118.1
5,099,430 A * 3/1992 Hirsch ......................... 73/462
5,162,815 A * 11/1992 Hodge ......................... 347/217
5,813,346 A * 9/1998 Solomon ..................... 101/483
6,204,871 B1 * 3/2001 Keller et al. ................ 347/139
6,283,652 B1 * 9/2001 Sasaki et al. ............... 400/208
6,505,142 B1 * 1/2003 Inoue et al. ................ 702/173
6,525,754 B2 * 2/2003 Landolt ...................... 347/139

* cited by examiner

*Primary Examiner*—Andrew H. Hirshfeld
*Assistant Examiner*—Dave A. Ghatt
(74) *Attorney, Agent, or Firm*—Sughrue Mion, PLLC

(57) ABSTRACT

The drum has a balancer disposed at both ends of a drum body around which a printing plate is wound, and with a rotating shaft rotatably supported by a supporting plate via an elastic support member of a shaft receiving member. When the rotating drum is rotated in a state in which the rotating drum is out of balance, the elastic support member is elastically deformed so that the rotating shaft rotates integrally with the rotating drum. Balance of the drum is restored by eccentric revolution of the balancers, whereby the rotating drum is rotated around a center of the rotating shaft. A recording head is mounted at a bracket that moves integrally with the rotating drum. Thus, the recording head continually opposes a fixed position at the rotating drum, and an appropriate image can be formed on a printing plate.

20 Claims, 9 Drawing Sheets

ROTOR BALANCING STRUCTURE, SHEET MATERIAL PROCESSING DEVICE, AND IMAGE FORMING DEVICE

BACKGROUND OF THE INVENTION

1. Field of the Invention

The present invention relates to a rotor balancing structure, a sheet material processing device, and an image forming device.

2. Description of the Related Art

There has been provided an image exposure device in which a light-sensitive printing plate (referred to as a "printing plate" hereinafter) having a light-sensitive layer formed on a sheet-type support such as thin aluminum is wound around a rotating drum, a light beam corresponding to image data is irradiated onto the printing plate while the rotating drum is being rotated at high speed (for example, 600 rpm or more), and the printing plate is thereby scanned and exposed.

In a case in which the printing plate has been wound around the rotating drum, sometimes, an unbalanced state in which the center of gravity of the rotating drum deviates from the center of rotation may occur. When the rotating drum is made to rotate at high speed in an unbalanced state, vibration occurring at the rotating drum may damage an image to be formed on the printing plate that has been wound around the rotating drum, and may furthermore produce noise or damage the interior of the device.

In order to prevent such an unbalanced state from occurring, there is provided a method in which, when the printing plate is wound around the rotating drum and attached thereto, balancing weights are mounted to the rotating drum. The balancing weight is mounted in such a way that the amount of unbalance, which is a displacement between the center of rotation of the rotating drum and the center of gravity thereof, is measured or calculated on the basis of a weight of the printing plate and a position at which the printing plate is mounted to the rotating drum. The weight of the balancing weight and the position at which the printing plate is mounted to the drum are calculated so as to correct the unbalanced state. On the basis of the calculation, a balancing weight may be mounted to the rotating drum, or the balancing weight which has already been mounted to the drum may be moved.

The size of the printing plate is determined so as to correspond to a size of prints. For this reason, a plurality of cassettes in which printing plates of different sizes are respectively accommodated are mounted at the image exposure device, a printing plate of a specified size is taken out from a corresponding cassette and is then mounted at the rotating drum.

If the size of the printing plate differs, the weight thereof changes. Further, the amount of unbalance when the printing plate is wound around the rotating drum changes in accordance with the size of the printing plate. At this time, when a size of the printing plate is input manually by an operator in order to balance the rotating drum, if the operator inputs a wrong printing plate size, the rotating drum is made to rotate in an unbalanced state, thus causing damage to the image exposure device or the like.

In order to prevent such damage to the image exposure device or the like due to the inputting of a wrong printing plate size, it might be thought that a sensor for detecting whether the rotating drum is rotating in an unbalanced state could be provided at the device, such that the rotation of the rotating drum is stopped immediately when the rotating drum has been judged by the sensor to be in an unbalanced state. However, were such a sensor to be provided, the interior of the device would become complicated.

On the other hand, there is also provided a method in which the size of the printing plate that has been wound around the rotating drum is detected by a sensor. However, in this case also, in order to provide the sensor for detecting the size of the printing plate, the interior of the device becomes complicated, and in addition to a sequence for adjusting the balancing weight, another sequence for detecting the size of the printing plate must be provided before the rotating drum rotates, thus becoming an obstacle to rapid exposure processing.

SUMMARY OF THE INVENTION

In view of the aforementioned facts, an object of the present invention is to provide a rotor balancing structure that can rotate and drive the rotor with an appropriate balance without using a sequence for correcting an unbalanced state of the rotor.

Further, it is another object of the present invention to provide a sheet material processing device and an image forming device that have been improved in the same manner as the rotor balancing structure.

In order to solve the aforementioned problems, there is provided a rotor balancing structure for rotating an object, the structure comprising: (a) a rotor to which an object can be removably fixed; (b) a support rotatably supporting the rotor and elastically supporting the rotor so that the rotor may be displaced in a radial direction thereof at the time that the rotor to which the object has been fixed is rotated; and (c) a balancer that can rotate together with the rotor and alter a position of the center of gravity of the balancer, such that a dynamic balance of the overall rotor including the object at the time that the rotor to which the object has been fixed is rotated can be obtained.

A sheet material processing device according to the present invention comprises: (a) a rotatable drum having an outer circumference around which a sheet material can be wound and fixed; (b) a driving device which rotates the drum when operated; (c) a support that can support a rotation of the drum and elastically support the drum so that the drum may be displaced in a radial direction thereof at the time that the drum around which the sheet material has been wound and fixed is rotated; (d) a balancer that can rotate together with the drum and alter a position of the center of gravity of the balancer, such that a dynamic balance of the overall drum including the sheet material at the time that the drum to which the sheet material has been wound and fixed is rotated can be obtained; and (e) a processing element for applying a predetermined processing to the sheet material on the outer circumference of the drum.

An image forming device according to the present invention comprises: (a) a rotatable drum having an outer circumference around which a printing plate can be wound; (b) a driving device which rotates the drum when operated; (c) a support that can support a rotation of the drum and elastically support the drum so that the drum may be displaced in a radial direction thereof at the time that the drum around which the printing plate has been wound is rotated; (d) a balancer which can rotate together with the drum and alter a position of the center of gravity of the balancer, such that a dynamic balance of the overall drum including the sheet material at the time that the drum to which the sheet material has been wound and fixed is rotated can be obtained; (e) a recording device for recording an image onto the printing plate at the outer circumference of the drum; and (f) wherein the driving device and/or the recording device, rather than rotating with the drum, are structured to be able to move in accordance with a displacement of the drum.

DESCRIPTION OF THE PREFERRED EMBODIMENTS

Figure 1:
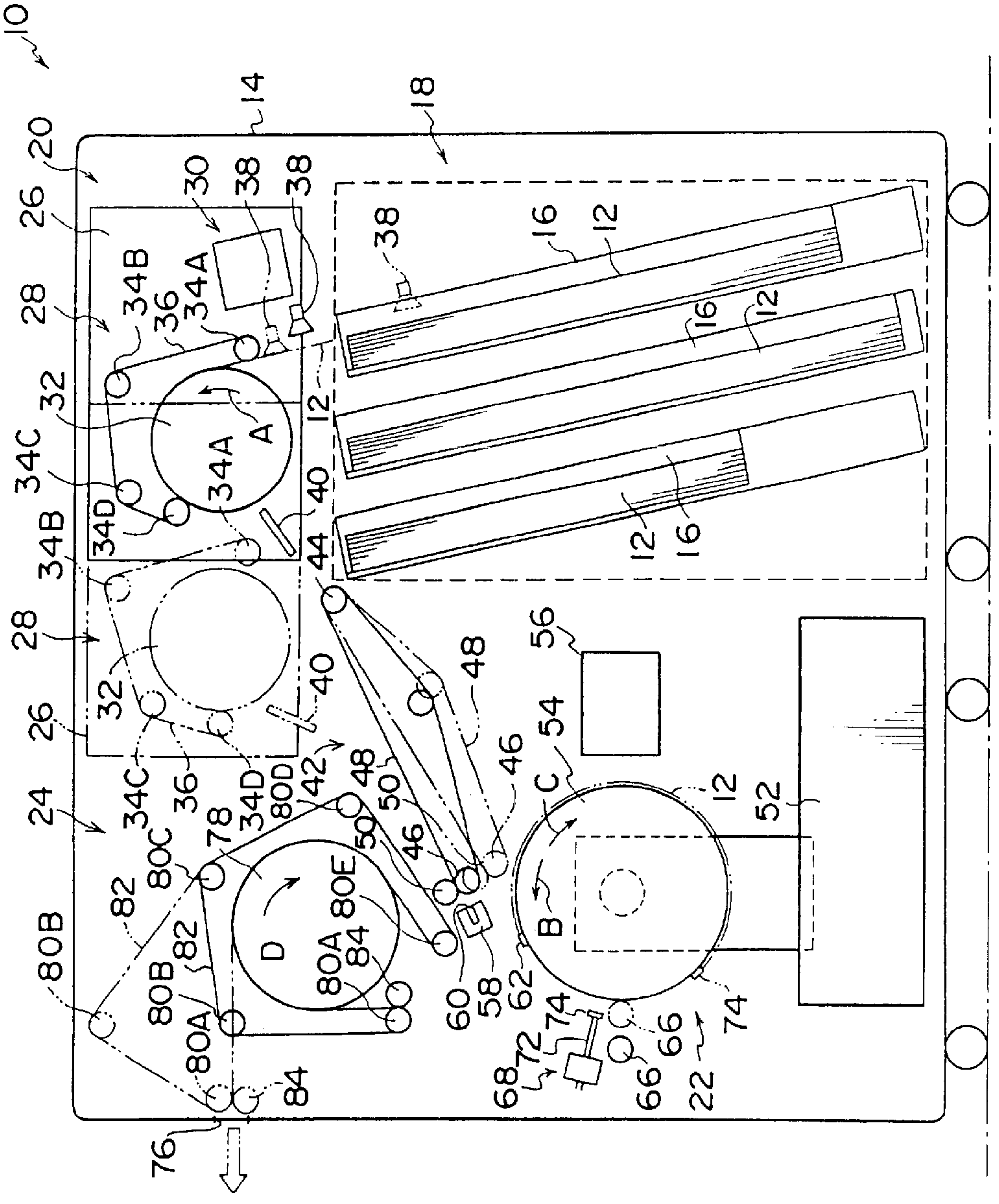
FIG. 1 is a schematic structural view of an image exposure device according to an embodiment of the present invention.

With reference to the drawings, an embodiment of the present invention will be explained hereinafter. FIG. 1 shows a schematic structure of an image exposure device 10 which is applied to the embodiment of the present invention. Using a light-sensitive planographic printing plate (hereinafter referred to as a "printing plate 12"), in which a light-sensitive layer is formed on a thin (e.g., having a thickness of about 0.3 mm), rectangular support formed of, for example, aluminum, the image exposure device 10 irradiates onto the printing plate 12 a light beam modified on the basis of image data, whereby the printing plate 12 is scanned and exposed. The printing plate 12, for which image exposure has been completed by the image exposure device 10, is subjected to development processing or the like by an unillustrated automatic processor or the like.

In this image exposure device 10, a cassette loading section 18, a plate feeding and conveying section 20, a recording section 22, a discharge buffer section 24, and the like are provided inside a machine casing 14. The cassette loading section 18 is disposed at a lower right-hand side of FIG. 1 inside the machine casing 14. A plurality of cassettes 16, each accommodating a large number of printing plates 12, is loaded at a predetermined angle in a state in which the cassettes 16 are slanted in the cassette loading section 18.

It is possible to process in the image exposure device 10 numerous-sized printing plates 12 having different vertical and horizontal dimensions. Printing plates 12 of whatever size are accommodated in the cassettes 16 such that the light-sensitive layers of the printing plates 12 face upward and an end thereof is positioned to correspond to a predetermined position. Further, the plurality of the cassettes 16 is loaded in the cassette loading section 18 so as to be spaced apart from each other at a predetermined distance and such that an end portion of the printing plate 12 accommodated in each cassette 16 reaches a substantially fixed height.

The plate feeding and conveying section 20 is disposed above the cassette mounting portion 18, and the recording section 22 is disposed at a lower, central area within the image exposure device 10, adjacent to the cassette loading section 18. A pair of side plates 26 (only one of which is shown in FIG. 1) is provided at the plate feeding and conveying section 20, and a reversal unit 28 and a sheet unit 30 are mounted to each of the pair of the side plates 26.

The reversal unit 28 is provided with a reverse roller 32 having outer diameter of a predetermined dimension. A plurality of small rollers (for example, four small rollers 34A, 34B, 34C and 34D in the present embodiment) are provided around the reverse roller 32. The small rollers 34A to 34D are disposed so as to straddle the reverse roller 32 from the cassette loading section 18 to the recording section 22, and an endless conveying belt 36 is entrained around these small rollers 34A to 34D. Accordingly, the conveying belt 36 is entrained over the reverse roller 32 so that the conveying belt 36 stretches to roughly half the circumference of the reverse roller 32 between the small roller 34A and the small roller 34D.

A plurality of suction cups 38 which suck top ends of the printing plates 12 in the cassettes 16 are provided at the sheet unit 30. The suction cups 38 are lowered to face the top ends of the printing plates 12 in the cassettes 16 loaded at the cassette loading section 18, and suck the printing plate 12. Further, at the sheet unit 30, the suction cups 38 which have sucked the printing plate 12 are raised substantially upwardly so that leading ends of the printing plates 12 are pulled out from the cassette 16 and then inserted between the reverse roller 32 and the conveying belt 36. Moreover, in FIG. 1, the moving position of the suction cups 38 is schematically illustrated by a double-dashed line.

At the reversal unit 28, the reverse roller 32 and the conveying belt 36 are rotated in a direction in which the printing plate 12 is pulled out from the cassette 16 (in the direction of arrow A in FIG. 1). Thus, the printing plate 12 is nipped between the reverse roller 32 and the conveying belt 36, is pulled out from the cassette 16, is curved while the printing plate 12 is wound around the circumferential surface of the reverse roller 32, and then inverted. Further, a radius of the reverse roller 32 is of a dimension which prevents the printing plate 12 from failing or crimping when it is curved (e.g., 100 mm or more).

As shown by a solid line and the double-dashed line in FIG. 1, the side plates 26 move horizontally in accordance with the position of the cassette 16 from which the printing plate 12 is to be pulled out. Thus, the sheet unit 30 is moved together with the reversal unit 28 so that the suction cups 38 of the sheet unit 30 are made to face the printing plate 12 in the selected cassette 16.

At the side plate 26, a guide 40 is provided below the small roller 34D. The printing plate 12 which has been inverted by the reverse roller 32 is passed between the reverse roller 32 at the small roller 34D side and the conveying belt 36, and fed to this guide 40.

A conveyer 42 is disposed above the recording section 22, and the printing plate 12 which has been fed out from the reversal unit 28 is guided by the guide 40 to the conveyer 42. Further, the guide 40 swings in accordance with the movement of the side plate 26 such that the direction in which the printing plate 12 is guided is always directed to the conveyer 42. The small roller 34D at the recording section 22 side moves in accordance with the movement of the side plate 26 such that the direction in which the printing plate 12 is fed out from the reversal unit 28 is changed. Accordingly, the printing plate 12 which is fed out from the reversal unit 28 is gently curved by the guide 40. Moreover, as the small roller 34D moves, the small roller 34C moves so as to apply a substantially fixed tension to the conveying belt 36.

At the conveyer 42, a conveying belt 48 is entrained between a roller 44 adjacent to an area beneath the plate feeding and conveying section 20, and a roller 46 adjacent to the upper portion of the recording section 22. The conveyer 42 is slanted such that the roller 46 is disposed lower than the roller 44.

Figure 2:
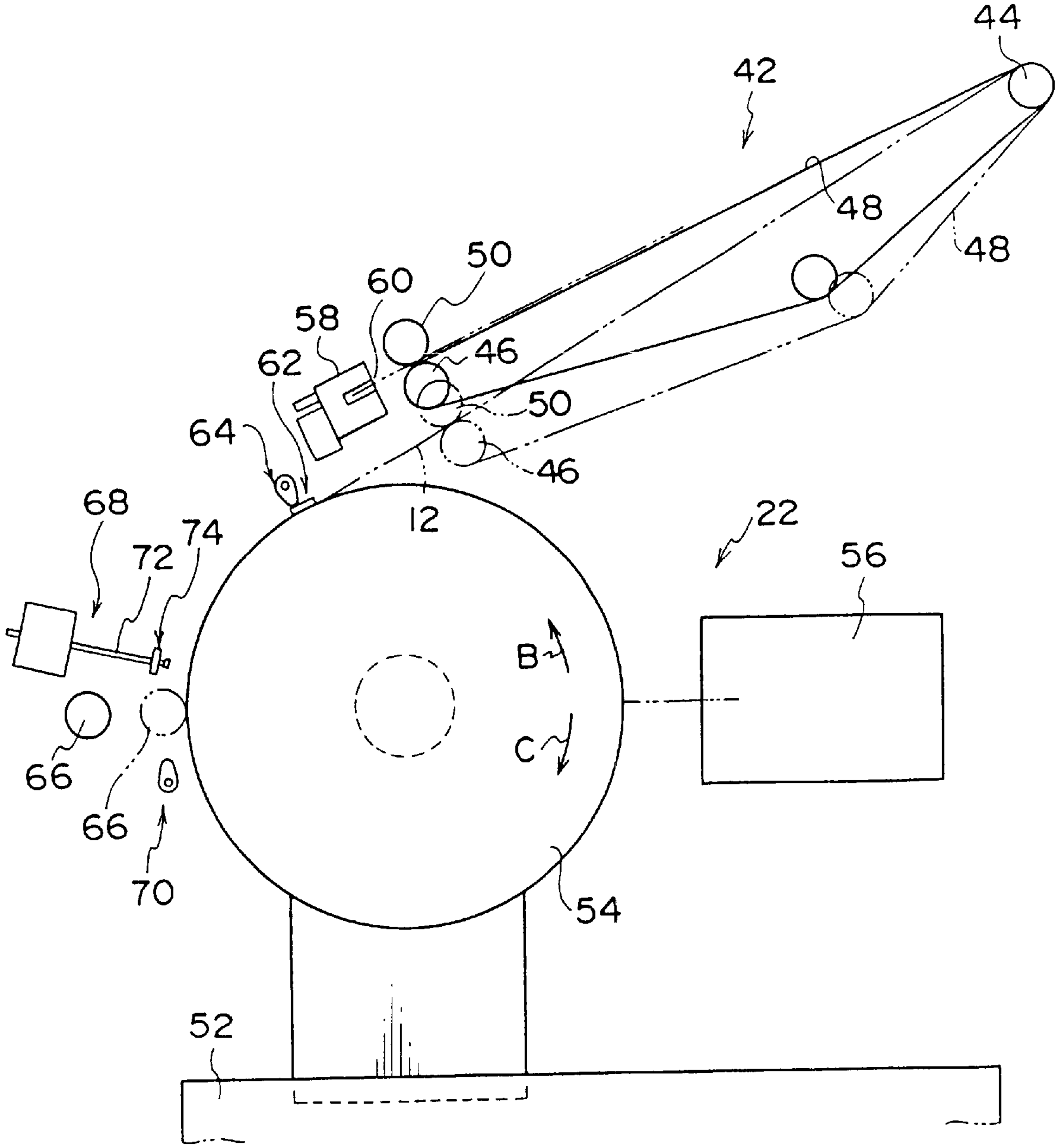
FIG. 2 is a schematic structural view of a recording section which is provided at the image exposure device.

As shown in FIGS. 1 and 2, at the conveyer 42, the roller 50 is disposed so as to face the roller 46. The printing plate 12 which has been fed onto the conveyer 42 is conveyed along the conveying belt 48, and is nipped into the roller 46 and the roller 50.

A rotating drum 54 and a recording head 56 are mounted on a rack 52 at the recording section 22. A puncher 58 is disposed above the rotating drum 54. An opening 60 is formed at the puncher 58.

The printing plate 12 which has been nipped by the rollers 46 and 50 is first fed by the conveyer 42 to the opening 60 of the puncher 58, and the leading edge of the printing plate 12 is inserted into the opening 60 of the puncher 58. When the printing plate 12 is inserted into the opening 60, the puncher 58 is operated so as to form a positioning notch at a predetermined position of the leading edge of the printing plate 12. Further, after forming of the notch by using the puncher 58 has been completed, the conveyer 42 is driven reversely, and the printing plate 12 is pulled out from the opening 60 of the puncher 58.

At the conveyer 42 is provided an unillustrated swinging means. With the conveyer 42 at the roller 44 side as a shaft, the conveyer 42 at the roller 46 side is lowered by this swinging means toward the rotating drum 54 of the recording section 22 (which is shown by a double-dashed line in FIGS. 1 and 2). Thus, the printing plate 12 at which the notch has been formed is fed to the recording section 22 in a state in which the leading edge thereof is directed to a predetermined position at the circumferential surface of the rotating drum 54.

The rotating drum 54 provided at the recording section 22 is rotated in a direction in which the printing plate 12 is mounted and exposed (the direction of arrow B in FIGS. 1 and 2), and in a direction in which the printing plate 12 is detached from the rotating drum 12 (the direction of arrow C in FIGS. 1 and 2) opposing the direction in which the printing plate 12 is mounted and exposed.

As shown in FIG. 2, a leading edge chuck 62 is mounted at a predetermined position of the outer circumferential surface of the rotating drum 54 provided at the recording section 22. At the recording section 22, when the printing plate 12 is mounted to the rotating drum 54, the rotating drum 54 is stopped such that the leading edge chuck 62 is disposed at a position which opposes the leading edge of the printing plate 12 fed by the conveyer 42 (i.e., a position at which the printing plate is mounted to the rotating drum 54).

At the recording section 22, a mounting cam 64 is provided at the position at which the printing plate 12 is mounted to the rotating drum 54 so as to oppose the leading edge chuck 62. The mounting cam 64 is rotated to press a portion of the leading edge chuck 62 at an end side thereof, and enables the printing plate 12 to be inserted between the leading edge chuck 62 and the circumferential surface of the rotating drum 54.

The leading edge portion of the printing plate 12 that has been fed to the recording section 22 by the conveyer 42 is inserted between the leading edge chuck 62 and the circumferential surface of the drum 54. In this state, as the mounting cam 64 is rotated, the leading edge of the printing plate 12 is nipped between the leading edge chuck 62 and the rotating drum 54, and fixed to the rotating drum 54. At this time, the printing plate 12 is positioned with respect to the rotating drum 54 by an unillustrated positioning pin which projects from the circumferential surface of the rotating drum 54 at a predetermined position thereof and which enters into the notch which has been formed by the puncher 58.

In the recording section 22, when the leading edge of the printing plate 12 is fixed to the rotating drum 54, the rotating drum 54 is rotated in the direction in which the printing plate 12 is mounted and exposed. Thus, the printing plate 12 fed from the conveyer 42 is wound around the circumferential surface of the rotating drum 54.

In the vicinity of the circumferential surface of the rotating drum 54, a squeeze roller 66 is disposed at the downstream side of the mounting cam 64 in the direction in which the printing plate 12 is attached and exposed. When the printing plate 12 is wound around the rotating drum 54, this squeeze roller 66 is moved toward the rotating drum 54 so that the printing plate 12 is nipped between the rotating drum 54 and the squeeze roller 66. Thus, the printing plate 12 is kept in close contact with the circumferential surface of the rotating drum 54.

Further, at the recording section 22, a trailing edge chuck detachable unit 68 is disposed at the upstream side of the squeeze roller 66 in the direction in which the printing plate 12 is mounted and exposed. A detachable cam 70 is disposed at the downstream side of the squeeze roller 66 in the direction in which the printing plate 12 is mounted and exposed. At the trailing edge chuck detachable unit 68, a trailing edge chuck 74 is disposed detachably at the tip end portion of a shaft 72 which moves toward the rotating drum 54.

At the recording section 22, when the trailing edge of the printing plate 12 which has been wound around the rotating drum 54 opposes the trailing edge chuck detachable unit 68, the shaft 72 is projected so as to mount the trailing edge chuck 74 to the rotating drum 54 at a predetermined position thereof. Thus, the trailing edge of the printing plate 12 is nipped between the trailing edge chuck 74 and the rotating drum 54 and fixed thereto.

At the recording section 22, when the leading edge and the trailing edge of the printing plate 12 are held at the rotating drum 54, the squeeze roller 66 is made to separate from the drum 54. While the rotating drum 54 is made to rotate at a predetermined high rotational speed, a light beam which has been modulated on the basis of image data is irradiated from the recording head 56 onto the printing plate 12 synchronously with the rotation of the rotating drum 54, whereby the printing plate 12 is scanned and exposed in accordance with the image data.

At the recording section 22, when scanning and exposure of the printing plate 12 have been completed, the rotating drum 54 is temporarily stopped by the trailing edge chuck 74 at a position where the trailing edge chuck 74 on the rotating drum 54 opposes the trailing edge chuck detachable unit 68. Then, the trailing edge chuck 74 is detached from the rotating drum 54 so as to release the trailing edge of the printing plate 12, and the printing plate is pressed by the squeeze roller 66 toward the rotating drum 54. In this state, the rotating drum 54 is rotated in the direction in which the trailing edge chuck 74 is detached from the rotating drum 54 so that the printing plate 12 is fed out from the trailing edge side thereof to a discharge buffer section 24.

Further, at the recording section 22, when the leading edge chuck 62 reaches a position at which the leading chuck 62 opposes the detaching cam 70 and at which the printing plate 12 is detached from the rotating drum 54, the rotating drum 54 is stopped, the leading edge chuck 62 is pressed by the detaching cam 70 so as to release the leading edge of the printing plate 12.

As shown in FIG. 1, the discharge buffer section 24 is disposed above the squeeze roller 66. This discharge buffer section 24 is provided with a discharge roller 78 disposed to an inner side of the discharge outlet 76 formed in the machine casing 14. A plurality of small rollers (for example, small rollers 80A, 80B, 80C, 80D, and 80E) is disposed around the discharge roller 78. An endless conveying belt 82 is entrained around these small rollers 80A to 80E around the discharge roller 78 in a range of between about ½ to about ¾ the circumference of the discharge roller 78.

The small roller 80A is provided at the squeeze roller 66 side of the recording section 22 so as to face the roller 84. The printing plate 12 which has been fed out from the recording section 22 is guided between the small roller 80A and the roller 84 and nipped therebetween.

At the discharge buffer section 24, the discharge roller 78 is driven to rotate in the direction in which the printing plate 12 is pulled out (in the direction of arrow D). Thus, the printing plate 12 which is nipped between the small roller 80A and the roller 84 is pulled out from the recording section 22 and guided between the discharge roller 78 and the conveying belt 82. Then, the printing plate 12 is nipped between the discharge roller 78 and the conveying belt 82, and is wound around the discharge roller 78. At this time, at the discharge buffer section 24, the leading edge portion of the printing plate 12 (i.e., the printing plate 12 at the trailing edge side thereof which has been fed out from the recording section 22) is nipped between the small roller 80A and the roller 84 so that the printing plate 12 which has been wound around the discharge roller 78 is temporarily held.

As shown by the double-dashed line in FIG. 1, at the discharge buffer section 24, the small roller 80A and the roller 84 are moved to a position at which these rollers 80A and 84 face the discharge outlet 76. Thus, the leading edge of the printing plate 12 which has been wound around the discharge roller 78 is directed to the discharge outlet 76. Further, the small roller 80B which is provided above the small roller 80A moves in accordance with the movement of the small roller 80A, and applies a constant tension to the conveying belt 82.

At the discharge buffer section 24, when the leading edge of the printing plate 12 is directed to the discharge outlet 76, the discharge roller 78 is rotated in the direction that the printing plate 12 is fed out (i.e., the opposite direction of arrow D) at a rotational speed that corresponds to the speed at which the printing plate 12 is conveyed at processing devices, such as an automatic processor and the like (not illustrated), provided adjacent to the discharge outlet 76. Accordingly, the printing plate 12 is fed out from the discharge outlet 76.

Figure 3:
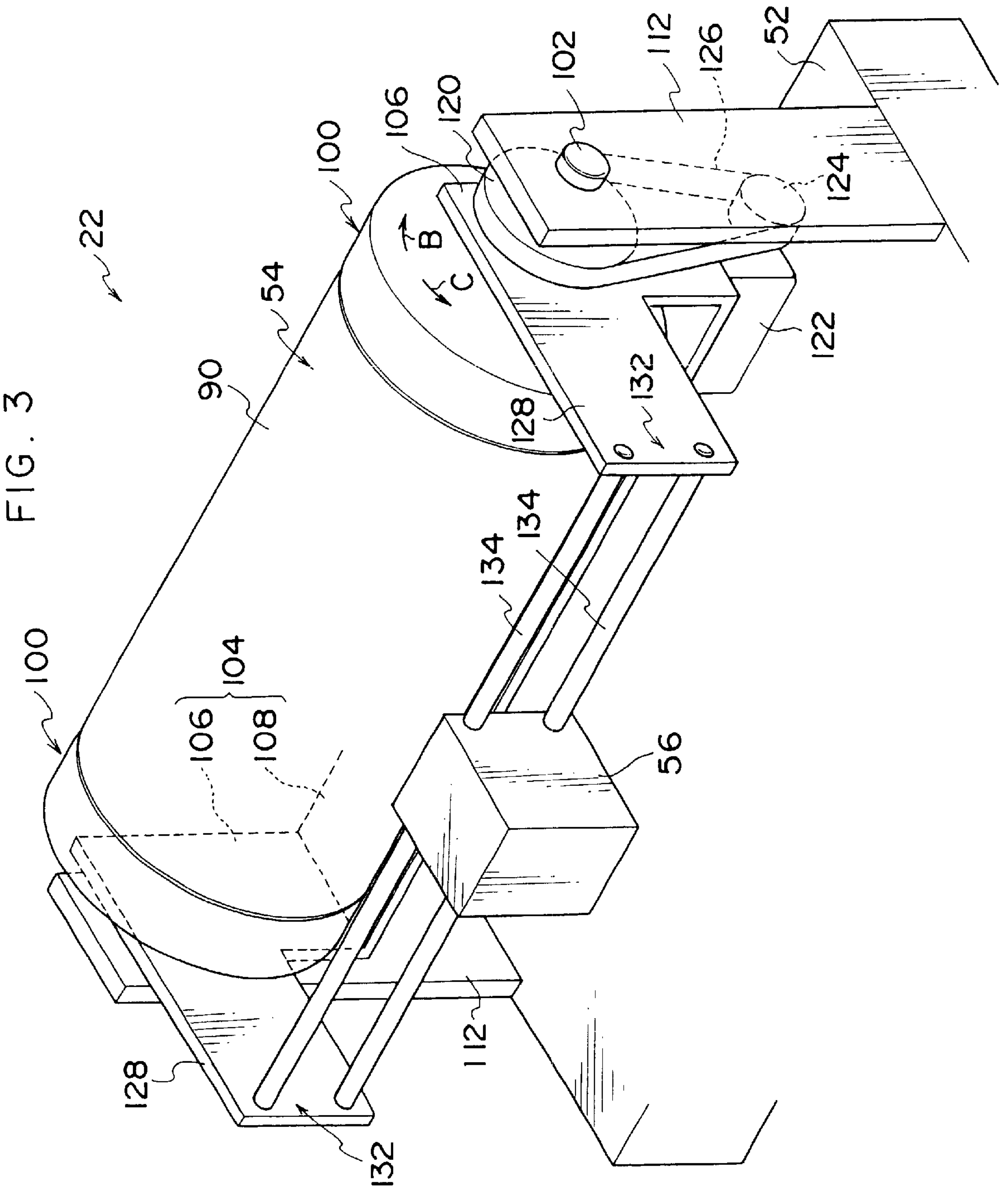
FIG. 3 is a schematic perspective view illustrating a main portion of the recording section in which a rotating drum is mounted.
Figure 4:
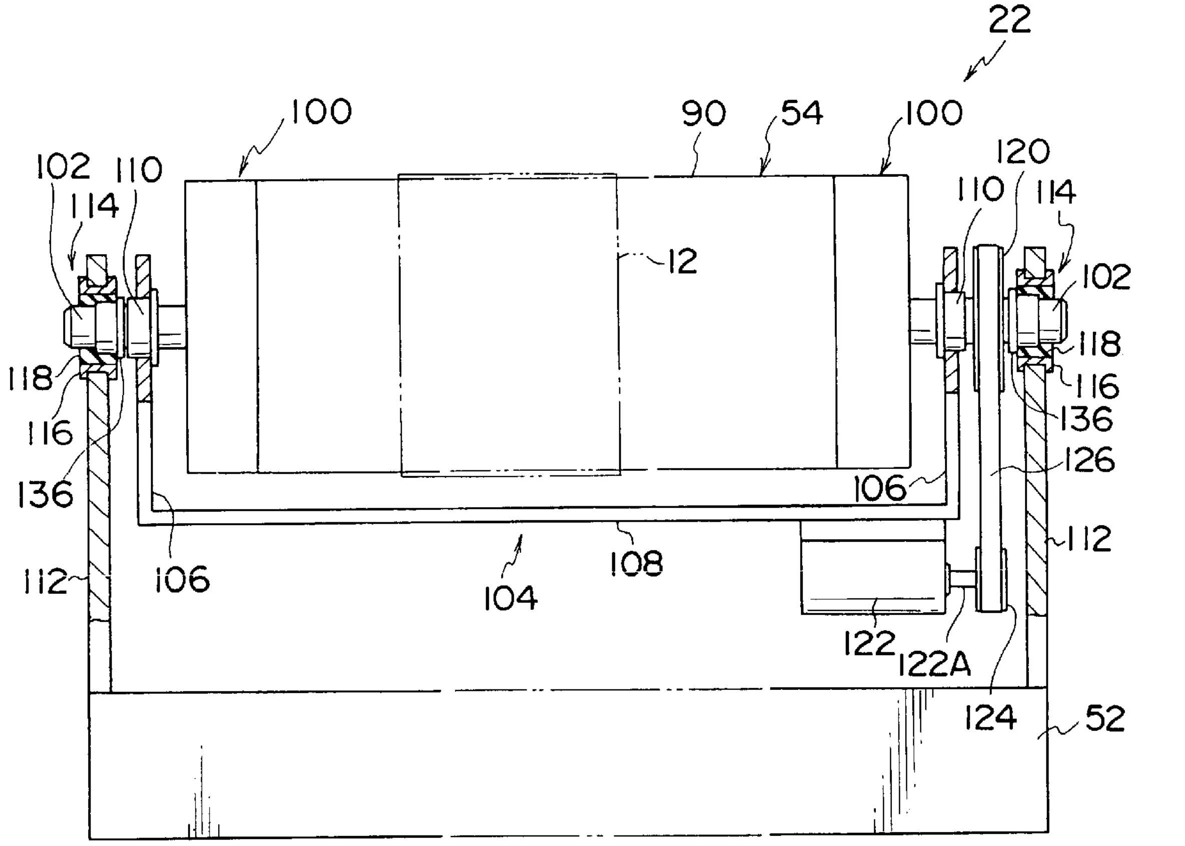
FIG. 4 is a schematic view illustrating a main portion of the recording section in which the rotating drum is mounted.

As shown in FIGS. 3 and 4, the rotating drum 54 provided at the recording section 22 has a drum body 90. The drum body 90 is formed in a cylindrical shape and has an outer circumferential surface around which the printing plate 12 is wound. A balancer 100 is provided at each end of the drum body 90 in the axial direction thereof. Further, a rotating shaft 102 is provided at the rotating drum 54 so as to project from the balancer 100. The rotating drum 54 is rotated integrally with the drum body 90, the balancer 100, and the rotational shaft 102.

A pair of supporting plates 112 is provided on the rack 52 at a substantially 90° angle to the surface of the rack 52 with which the pair makes contact. As shown in FIG. 4, a shaft receiving member 114 (not shown in FIG. 3) is disposed coaxially with each of the pair of the supporting plates 112. The tip end portion of the rotating shaft 102 is rotatably supported by the shaft receiving member 114. Thus, the rotating drum 54 is supported at the rack 52 so as to be able to rotate freely.

At the shaft receiving member 114 which is mounted to the supporting plate 112, an elastic support member 118 formed by an elastic body such as rubber is disposed by being inserted into a substantially cylindrical holder 116. The rotating shaft 102 is passed through a shaft receiving member 136 provided at the axial center of the elastic support member 118. The elastic support member 118 is deformed elastically so that the rotating drum 54 can move in accordance with the rotating shaft 102 in a radial direction thereof.

When a rotation of the rotating drum 54 is stopped or when it is not affected by a balance difference of the rotating drum 54 because the rotational speed is low, the elastic support member 118 does not deform elastically but supports the rotating drum 54 such that the axial center of the rotating drum 54 and that of the holder 116 correspond to each other.

Conversely, when the rotating drum 54 rotates at high speed (at about 600 rpm or more, for example, 1000 rpm) in an unbalanced state in which the center of gravity of the rotating drum 54 does not correspond to the center of the rotating shaft 102, the elastic support member 118 deforms elastically in accordance with the change in centrifugal force transmitted from the rotating shaft 102 to the rotating drum 54. Accordingly, the rotating shaft 102 can vibrate in a state in which the rotating shaft 102 is supported by the elastic support member 118.

A bracket 104 is also disposed above the rack 52 between the pair of the supporting plates 112. The bracket 104 is formed in a substantial U-shape by a pair of side plates 106 and a connecting plate 108 which connects the pair of the side plates 106 to each other.

As shown in FIG. 4, shaft receiving portions 110 are disposed coaxially with the pair of the side plates 106. The rotating shaft 102 is passed through the shaft receiving portions 110 so as to be able to rotate relatively with respect to the shaft receiving portions 110. Thus, when the rotating shaft 102 of the rotating drum 54 moves along a radial direction thereof, the bracket 104 moves integrally with the rotating shaft 102. Further, the bracket 104 is supported by an unillustrated supporting means so as not to be affected by vibration or the like of the rotating drum 54. The bracket 104 moves in accordance with the rotating shaft 102 in a state in which a rotation with the rotating shaft 102 as a center is inhibited.

As shown in FIGS. 3 and 4, a pulley 120 is mounted to at one side of the rotating shaft 102 between the supporting plate 112 and the side plate 106 of the bracket 104. Further, a main scanning motor 122 is mounted to the connecting plate 108 of the bracket 104. A pulley 124 is mounted to a driving shaft 122A (see FIG. 4) of the main scanning motor 122, and an endless timing belt 126 is entrained between the pulley 124 and the pulley 120. Thus, the driving force of the main scanning motor 122 is transmitted to the rotating shaft 102 by way of the timing belt 126, and the rotating drum 54 and the balancer 100 rotate with the rotating shaft 102.

As shown in FIG. 3, head supports 128 are formed at the bracket 104 so as to extend outwardly from the side plates 106 in a radial direction of the rotating drum 54. A pair of holders 132 are mounted respectively to ends of the head supports 128. A pair of shafts 134 disposed parallel to the axis of the rotating drum 54 is mounted so as to be laid between the holders 132.

The recording head 56 is mounted so as to span the shafts 134, and is supported movably along the axial directions of the shafts 134. Further, the recording head 56 is moved in a sub-scanning direction (i.e., the axial direction of each of the shafts 134) by an unillustrated sub-scanning means. Moreover, the sub-scanning means may have an arbitrary structure. For example, a forwarding screw may be formed at one of the shafts 134, a forwarding nut into which this forwarding screw is screwed may be rotated relatively with respect to the shaft 134 by a sub-scanning motor, so that the recording head 56 is moved in the sub-scanning direction. Alternatively, a moving mechanism independently of the shafts 134 can be provided so as to move the recording head 56 along the axial direction of the shaft 134.

When the rotating shaft 102 has moved together with the rotating drum 54 while elastically deforming the elastic support member 118, the recording head 56, which is connected to the rotating shaft 102 through the bracket 104, moves integrally with rotating drum 54. Namely, the recording head 56 moves integrally with the rotating drum 54 in a state in which the recording head 56 always opposes a predetermined position at the circumferential surface of the rotating drum 54.

Figure 5B:
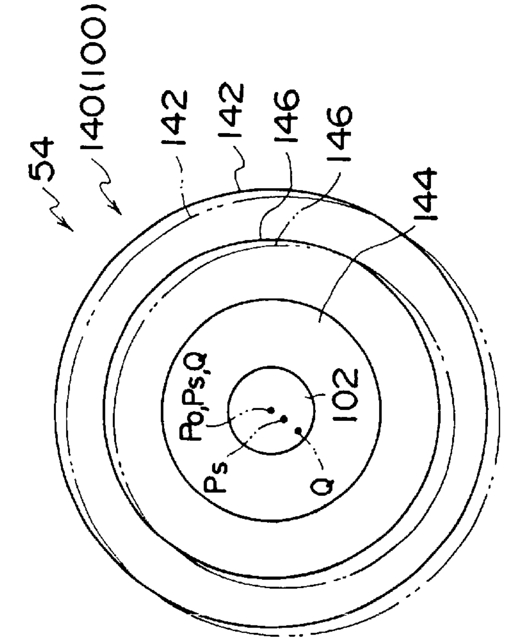
FIG. 5B is a schematic perspective view of the balancer shown in FIG. 5A, as seen from an axial direction end side of the balancer.
Figure 5A:
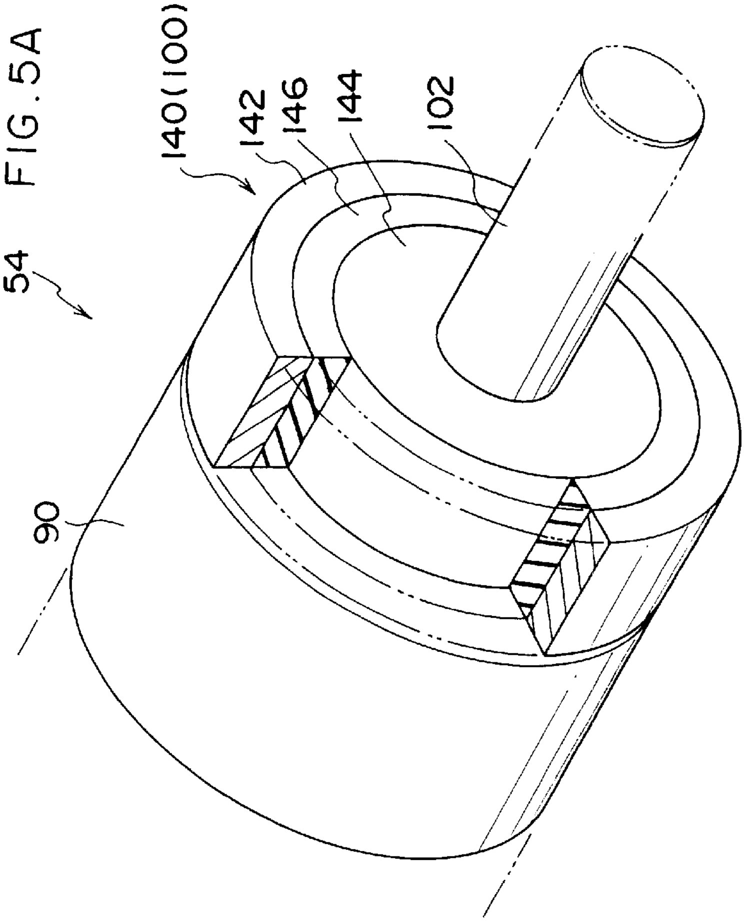
FIG. 5A is a schematic perspective view of an end portion of a rotating drum, illustrating an example in which a balancer uses a ring-shaped balancing weight.

FIGS. 5A and 5B show a balancer 140 as an example of the balancer 100. A balancing weight 142 formed in a ring-shape is provided at the outer circumference of the balancer 140. Further, a diameter enlarging portion 144 is formed at the circumference of the rotating shaft 102, and an elastic member 146 formed in a ring-shape is provided between the diameter enlarging portion 144 and the balancing weight 142.

As shown by a solid line in FIG. 5B, the balancing weight 142 is ordinarily provided coaxially with the rotating shaft 102 by the elastic member 146. The center of gravity Q of the balancing weight 142, the axial center $P_0$ of the rotating shaft 102, and the center of gravity $P_s$ of the rotating drum 54 correspond to one another. However, since the elastic member 146 elastically deforms, as shown by a double-dashed line in FIG. 5B, the center of gravity Q of the balancing weight 142 shifts with respect to the axial center $P_0$ of the rotating shaft 102. Due to this shift in the center of gravity Q of the balancing weight 142 from the axial center $P_0$ of the rotating shaft 102, the center of gravity $P_s$ of the rotating drum 54 shifts with respect to the axial center $P_0$ of the rotating shaft 102.

The position of the center of gravity $P_s$ of the rotating drum 54 changes by the printing plate 12 being wound around the outer circumferential surface of the drum body 90. In this state, the rotating drum 54 is rotated at high speed, and the rotating shaft 102 thereby vibrates inside the elastic support member 118 while elastically deforming the elastic support member 118. At this time, at the balancer 140, the balancing weight 142 rotates eccentrically while elastically deforming the elastic member 146, and the center of gravity Q of the balancing weight 142 thereby moves in the direction in which a shift in the center of gravity $P_s$ of the rotating drum 54 is suppressed. Thus, the center of gravity $P_s$ of the rotating drum 54 is corresponded to the axial center $P_0$ of the rotating shaft 102, and the rotating drum 54 thereby rotates around the axial center $P_0$ of the rotating shaft 102.

An operation of the present invention will be explained hereinafter.

In the image exposure device 10, image data to be exposed onto the printing plates 12 is input. The size and number of the printing plates 12 to be subjected to image exposure are set. When the order to initiate image exposure is given, image exposure processing of the printing plates 12 is initiated. Further, the image exposure device 10 may be one in which the processings are initiated by instructions given to the image processing device 10 by operation of a switch at an operation panel, and it may be one in which initiation of processing by the image exposure device 10 is ordered by a signal from an image processing device that outputs image data to the image processing device 10.

When the image exposure device 10 is instructed to start processings, the printing plate 12 of a designated size is taken out from the cassette 16 by the reversal unit 28 and the sheet unit 30. The printing plate 12 which has been taken out from the cassette 16 is fed to the conveyer 42 while being inverted. When the leading edge of the printing plate 12 which has been fed to the conveyer 42 is notched by the puncher 58, the printing plate 12 is fed toward the circumferential surface of the rotating drum 54 of the recording section 22.

At the recording section 22, when the leading edge of the printing plate 12 is held at the rotating drum 54 by the leading edge chuck 62 and then wound around the circumferential surface of the rotating drum 54, the trailing edge of the printing plate 12 is fixed to the rotating drum 54 by the trailing edge chuck 74. Thereafter, at the recording section 22, the printing plate 12 is scanned and exposed with a light beam irradiated from the recording head 56, while the rotating drum 54 is rotated at a predetermined rotational speed.

The printing plate 12, for which scanning and exposure have been completed, is fed out to the discharge buffer section 24 while being removed from the rotating drum 54. Then, the printing plate 12 is fed at a predetermined speed from the discharge buffer section 24 to the discharge outlet 76, and then discharged.

At the recording section 22, when the printing plate 12 is wound around the drum body 90 of the rotating drum 54 and fixed thereto, the rotating drum 54 is rotated at high speed (e.g., 1000 rpm) by the driving of the main scanning motor 122, and scanning and exposure of the printing plate 12 are carried out.

The center of gravity $P_s$ of the rotating drum 54 is moved by the printing plate 12 being wound around the drum body 90, and a displacement is thereby caused between the axial center $P_0$ of the rotational shaft 102 and the center of gravity $P_s$. The moving position of the center of gravity $P_s$ of the rotating drum 54 changes in accordance with the size of the printing plate 12. The center of gravity $P_s$ of the rotating drum 54 is shifted from the axial center $P_0$ of the rotational shaft 102 so that the rotating drum 54 thereby becomes unbalanced.

When the main scanning motor 122 is driven and the rotating drum 54 in the unbalanced state is rotated, vibration is generated due to centrifugal force. At this time, since the rotating shaft 102 is supported via the elastic support member 118, the rotating shaft 102 rotates integrally with the rotating drum 54 while elastically deforming the elastic support member 118 due to the centrifugal force from the rotating drum 54.

Figure 6:
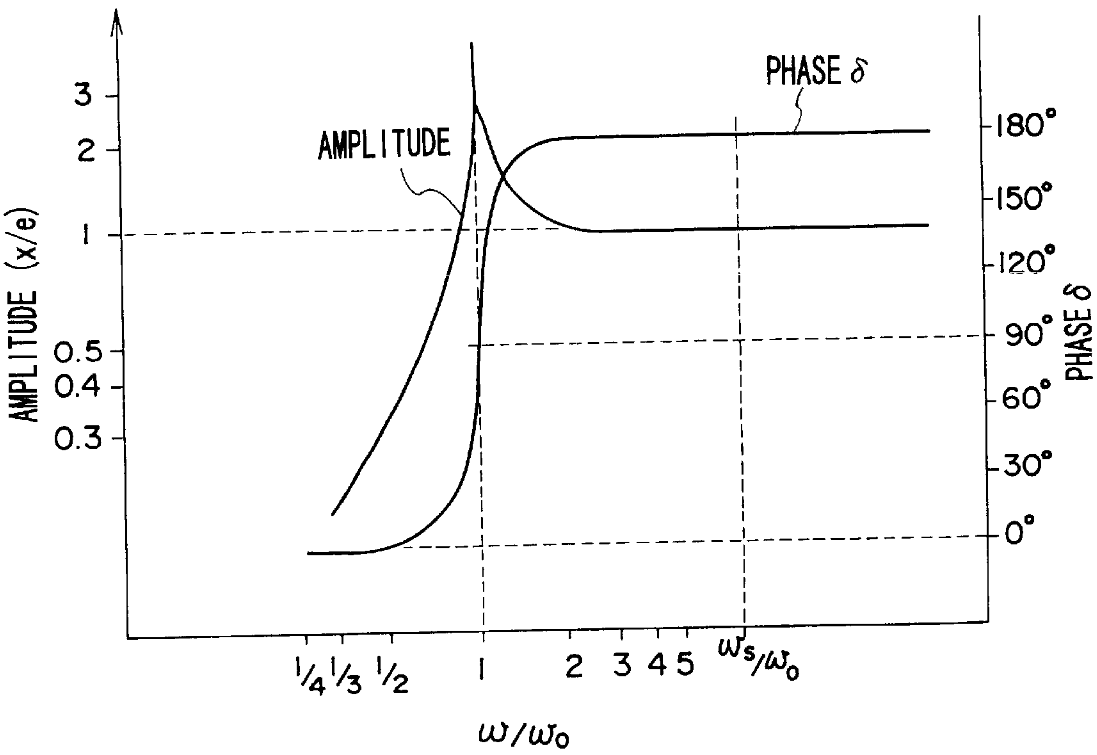
FIG. 6 is a diagram illustrating an example of changes in amplitude and phase with respect to a rotational frequency of the rotating drum when the rotating drum according to the embodiment has become unbalanced.

As shown in FIG. 6, when a rotational frequency ω of the rotating drum 54 increases, a ratio (amplitude x/e) of a distance e (between the center of rotation of the rotating drum 54 and the center of the elastic support member 118) to a distancex(between the center of rotation of the rotating drum 54 and the center of gravity of the rotating drum 54) continues to increase until the ratio reaches an oscillating point ($\omega/\omega_0=1$, however, $\omega_0$ is a natural vibration of the elastic support member) between vibration of the rotating drum 54 and that of the elastic support member 118.

A phase occurs between the vibration of the rotating drum 54 and the vibration (deformation) of the elastic support member 118. This phase gradually expands in accordance with the increase in the rotational frequency ω of the rotating drum 54.

When this rotational frequency ω of the rotating drum 54 exceeds the oscillating point, the amplitude x/e decreases gradually, and thereafter becomes fixed (which is x/e=1). Further, a phase δ between the vibration of the rotating drum 54 and the vibration of the elastic support member 118 forms an angle of 90° at the oscillating point. When the phase δ exceeds the oscillating point, the phase δ expands further as the rotational frequency ω increases, and then stabilizes with the amplitude x/e (the phase δ=180°).

Thus, when the rotating drum 54 reaches a predetermined rotational frequency $\omega_S$ that is set to be sufficiently higher than the oscillating point, the rotating drum 54 is set in a state in which the rotation of the rotating drum 54 is fixed. Namely, at the recording section 22, because the rotating shaft 102 of the rotating drum 54 is a so-called soft-type rotating shaft supported by the elastic support member 118, when the rotating drum 54 reaches a predetermined rotational frequency $\omega_S$, the rotating drum 54 is kept in a state in which rotation thereof is stable.

At this time, the rotating drum 54 and the rotating shaft 102 rotate with the center of gravity $P_s$ of the rotating drum 54 as a center of rotation.

On the other hand, when the rotating drum 54 rotates in an unbalanced state, since the center of gravity Q of the balancing weight 142 is shifted from the center of rotation, the balancer 100 (140) provided at the rotating drum 54 rotates eccentrically. Thus, a centrifugal force is generated from the balancing weight 142 of the balancer 140, and due to this centrifugal force, the balancing weight 142 moves while elastically deforming the elastic member 144.

When the center of gravity Q of the balancing weight 142 is shifted from the center of rotation by the centrifugal force, the rotating drum 54 moves in the direction in which the center of gravity $P_s$ that is the rotation center of the rotating drum 54 corresponds to the axial center $P_0$ of the rotating shaft 102.

The center of gravity $P_s$ of the rotating drum 54 is corresponded to the axial center $P_0$ of the rotating shaft 102, and the rotating drum 54 thereby rotates with the axial center $P_0$ of the rotating shaft 102 as a center.

In this way, the assembly of the rotating drum 54 provided at the recording section 22 is simply structured such that the balancer 100 is mounted to the drum body 90 and the rotating shaft 102 is supported through the elastic support member 118. Even when the rotating drum 54 becomes the unbalanced by the printing plate 12 being wound around the drum body 90, the rotating drum 54 can be balanced by the rotating drum 54 rotating at a predetermined rotational frequency. As a result, it is possible to reliably prevent damage to the interior of the image exposure device resulting from unbalanced rotation of the rotating drum 54.

Further, at the recording section 22, regardless of the size of the printing plate 12, the rotating drum 54 can be balanced merely by rotating the rotating drum 54. Accordingly, for example, inputting the size of the printing plate 12 to be wound around the rotating drum 54 or providing a sensor for detecting a vibration which is generated when the wrong size of the printing plate 12 has been input becomes unnecessary. Further, providing a sensor or a sequence for detecting the size of the printing plate 12 which is wound around the rotating drum 54, a sequence or a counter weight moving mechanism for balancing the rotating drum 54 in accordance with a detected size of the printing plate 12, and the like become unnecessary.

Namely, at the recording section 22, in order to appropriately balance the rotating drum 54, there is no need to structure or process the circumferential edge portion of the rotating drum 54 in a complicated manner.

The main scanning motor 122 is mounted to the bracket 104 in which the rotating shaft 102 is passed through the shaft receiving portion 110. Therefore, when the rotating shaft 102 moves integrally with the rotating drum 54, the main scanning motor 122 also moves. Accordingly, a rotational force can reliably be transmitted to the rotating shaft 102 so that the rotating drum 54 can be rotated.

Further, since the bracket 104 is also provided with the recording head 56, even when the center of rotation of the rotating drum 54 moves, the recording head 56 moves in accordance with the movement of the rotating drum 54, and a state in which the recording head 56 always faces a fixed position of the drum body 90 is thereby maintained. Accordingly, when the rotating drum 54 has been balanced, if the rotating shaft 102 rotates at a position at which the rotating shaft 102 is shifted from the axial center of the shaft receiving member 114, since the recording head 56 always faces a fixed position of the rotating drum 54, it becomes possible to record an appropriate image in which a focal shift has not been caused at an appropriate position of the printing plate 12.

The present embodiment has been explained by using, instead of the balancer 100, the balancer 140 which is formed by the balancing weight 142 and the elastic member 146 which are ring-shaped. However, the balancer 100 can be structured arbitrarily provided that the balancer is a so-called auto-balancing mechanism in which, when the rotating drum 54 rotates in an unbalanced state, the rotating drum 54 can be balanced in accordance with a state of rotation of each of the rotating drum 54 and the rotating shaft 102.

FIGS. 7A and 7B, and FIGS. 8A and 8B show an example of a balancer, instead of the balancer 140, which can be applied as the balancer 100 which is provided at the rotating drum 54.

Figure 7B:
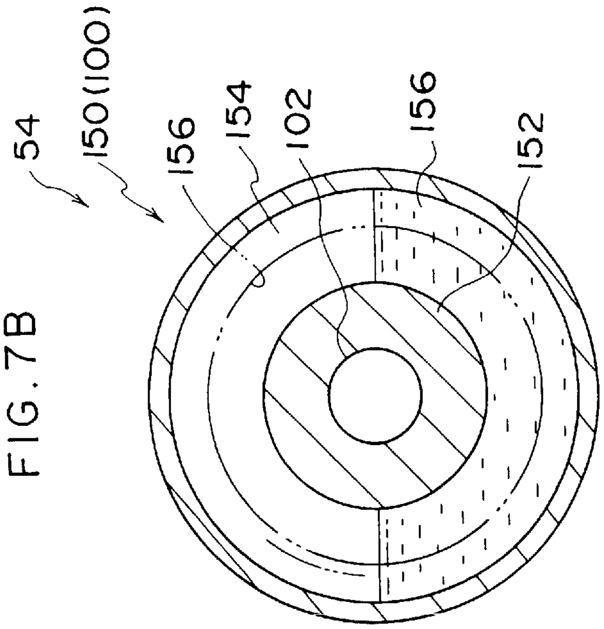
FIG. 7B is a schematic perspective view of the balancer shown in FIG. 7A, as seen from an axial direction end side of the balancer.
Figure 7A:
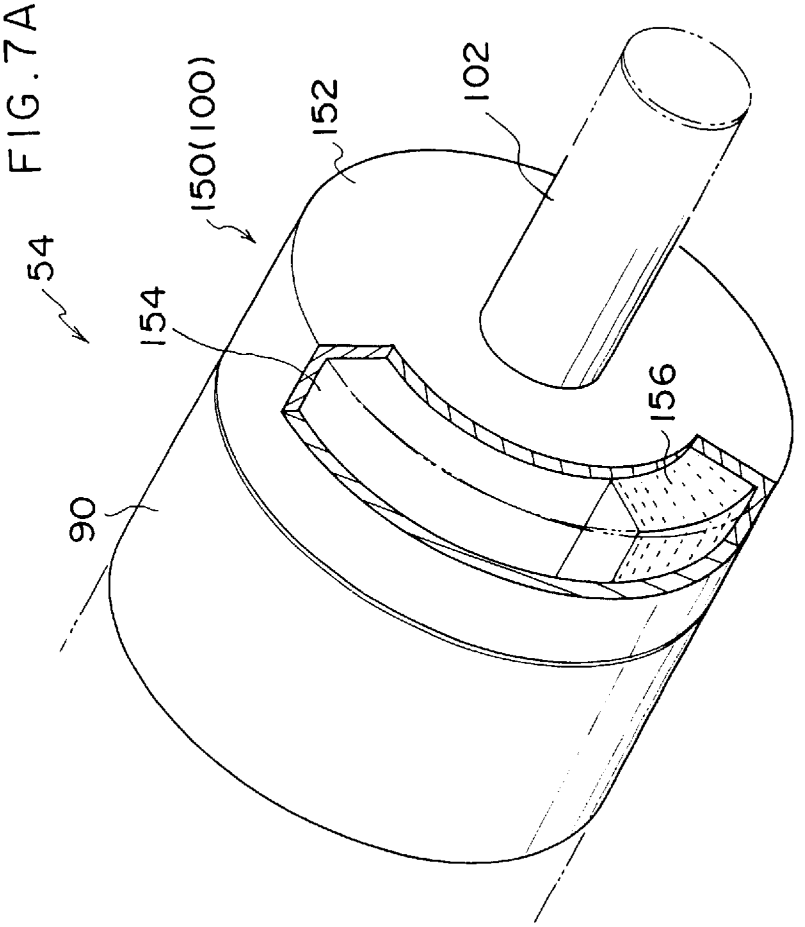
FIG. 7A is a schematic perspective view of an end portion of the rotating drum, illustrating an example in which the balancer uses a liquid weight.

A balancer 150 shown in FIGS. 7A and 7B has a ring-shaped ring pipe 154 formed inside a rotor 152 which rotates integrally with the rotating shaft 102. The ring pipe 154 is sealed, and accommodates therein a predetermined amount of a liquid weight 156.

The liquid weight 156 has a volume of about ½ of that of the ring pipe 154, for example, and is able to flow freely inside the ring pipe 154. The center of gravity Q (not shown) moves due to the flow of this liquid weight 156.

The rotating drum 54 having the balancer 150 as the balancer 100 becomes unbalanced by the printing plate 12 being wound around the drum body 90, and rotates with the center of gravity $P_s$ thereof as a center, and thereby vibrates. At the balancer 150, a centrifugal force acts upon the liquid weight 156 inside the ring pipe 154. This centrifugal force is weighed eccentrically so as to move the center of the gravity $P_s$ of the rotating drum 54 toward the axial center $P_0$ of the rotation shaft 102.

The rotating drum 54, which has become unbalanced by the printing plate 12 being wound around the drum body 90, reaches a predetermined rotational frequency so that the rotating drum 54 is balanced by the balancer 150 and thereby rotates.

Figure 8B:
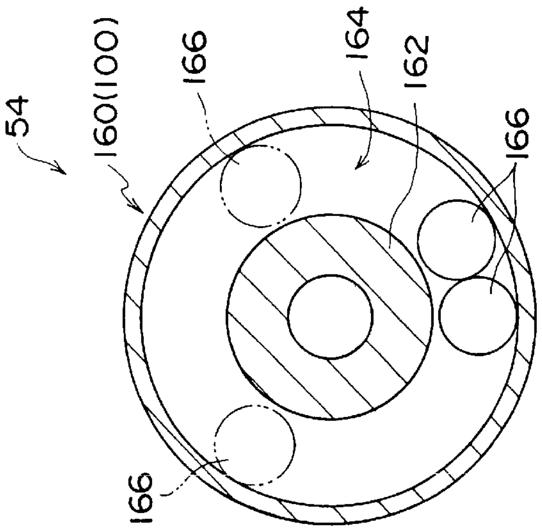
FIG. 8B is a schematic perspective view of the balancer shown in FIG. 8A, as seen from an axial direction end side of the balancer.
Figure 8A:
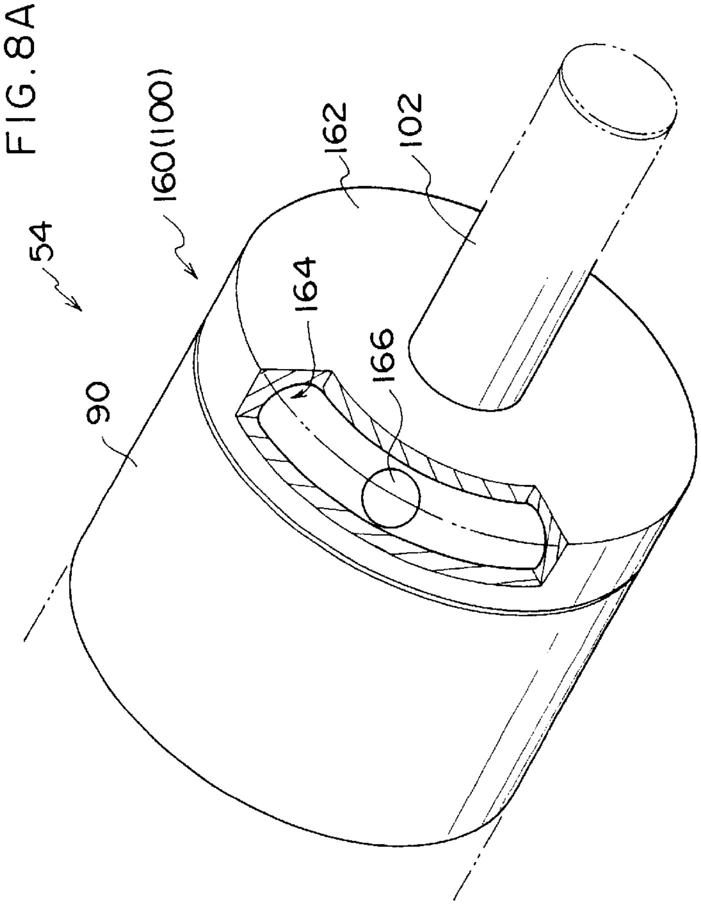
FIG. 8A is a schematic perspective view of an end portion of the rotating drum, illustrating an example in which the balancer uses spherical balancing weights.

A balancer 160 shown in FIGS. 8A and 8B has a ring pipe path 164 formed inside a rotor 162 which rotates integrally with the rotating shaft 102. This ring pipe path 164 is formed coaxially with the rotating shaft 102 and has a plurality of spherical weights 166 stored therein. Each of the spherical weights 166 can move freely inside the ring pipe path 164. The center of gravity Q of the balancer 160 moves in accordance with a position at which the weights 166 move.

The rotating drum 54 having the balancer 160 as the balancer 100 is set in the unbalanced state, and rotates with the center of gravity $P_s$ of the rotating drum 54 as a rotation center, and thereby vibrates. At the balancer 160, a centrifugal force acts upon each of the spherical weights 166 inside the ring pipe 164. The spherical weight 166 move in accordance with this centrifugal force. Due to this movement of the spherical weight 166, the center of the gravity $P_s$ of the rotating drum 54 is moved toward the axial center $P_0$ of the rotation shaft 102.

The rotating drum 54, which has become unbalanced by the printing plate 12 being wound around the drum body 90, reaches a predetermined rotational frequency, and the rotating drum 54 is balanced by the balancer 160, and thereby rotates. Namely, the balancer 160 prevents the rotating drum 54 from vibrating, and the rotating drum 54 thereby rotates with the axial center $P_0$ as a center of rotation.

In this way, an arbitrary structure can be applied to the balancer 100 provided that the balancer 100 of the present invention has such an auto-balance mechanism that, when the rotating drum 54 has become unbalanced and rotates eccentrically, the balancer 100 is rotated integrally with the rotating drum 54 so that displacement of the rotational center of the rotating drum 54 is automatically corrected.

In the present embodiment, the shaft receiving member 114 having the elastic support member 118 has been mounted to the supporting plate 112 so as to rotatably support the rotating shaft 102 of the rotating drum 54 through this shaft receiving member 114. However, the structure of the present invention is not limited to this.

Figure 9:
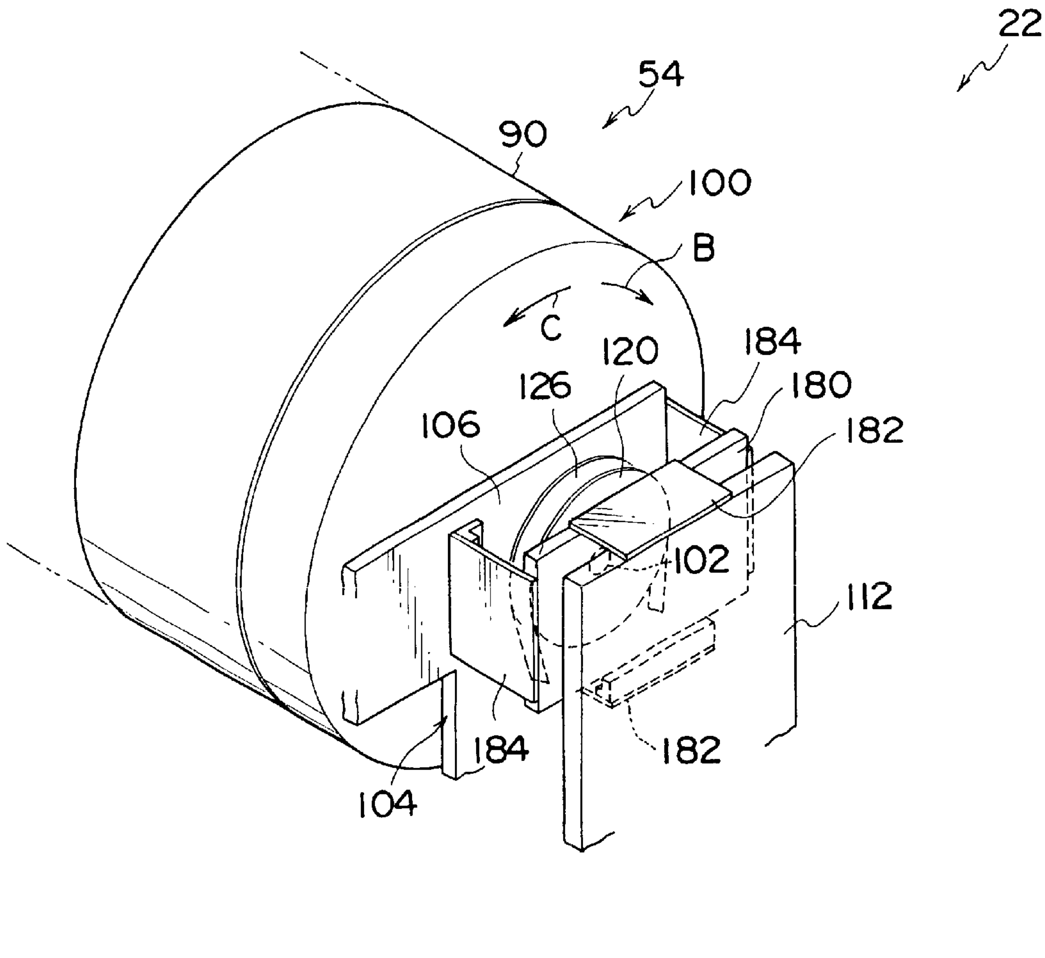
FIG. 9 is a perspective view of a main portion of the recording section, illustrating another example in which the rotating drum is supported.

For example, as shown in FIG. 9, instead of providing the shaft receiving member 114 at the supporting plate 112, an auxiliary supporting plate 180 is disposed between the side plate 106 of the bracket 104, and the supporting plate 112. A pair of elastic support members 182 connect between the supporting plate 112 and the auxiliary supporting plate 180. A pair of elastic support members 184 connect and support between the side plate 106 of the bracket 104 and the auxiliary supporting plate 180.

Each of the elastic support members 182 and 184 is formed in a plate spring, for example. By the elastic support members 182, both end portions of the auxiliary supporting plate 180, which sandwich the rotating shaft 102 therebetween, in the vertical direction (the vertical direction of the page of FIG. 9) are connected respectively to the supporting plate 112, and the auxiliary supporting plate 180 is thereby supported by the supporting plate 112. Further, by the elastic support members 184, both end portions of the auxiliary supporting plate 180, which sandwich the rotating shaft 102 therebetween, in the transverse direction are connected respectively to the side plate 106 of the bracket 104. Accordingly, the rotating drum 54, together with the bracket 104 at which the recording head 56 and the main scanning motor 122 (none of them are shown in FIG. 9) are provided, are supported by the supporting plate 112 through the elastic support members 182 and 184.

An elastic deformation of the elastic support member 182 enables the rotating drum 54 and the bracket 104 to move in the vertical direction thereof. Further, an elastic deformation of the elastic support member 184 enables the rotating drum 54 and the bracket 104 to move in the transverse direction thereof.

Thus, by supporting the rotating shaft 102 through the elastic support members 182 and 184, a soft-type vibration preventing mechanism is thereby formed in which, when the rotating drum 54 has been rotated in an unbalanced state, due to elastic deformations of the elastic support members 182 and 184, the rotating shaft 102 is able to move in a radial direction.

Accordingly, even when the rotating drum 54 has become unbalanced by the printing plate 12 being wound around the drum body 90, the rotating drum 54 can be balanced by the elastic support members 182 and 184 and the balancer 100, and thereby rotates.

In the present embodiment, an explanation has been given in which the present invention is used for the rotating drum 54 of the image exposure device 10 that scans and exposes the printing plate 12. However, the present invention is not limited to this, and can be applied to image recording devices of various structures in which a sheet-type light-sensitive material such as a printing paper or a film is scanned and exposed by being wound around the rotating drum 54.

As described above, the present invention has a simple structure such that a balancing means is provided at the drum body, the rotating shaft is supported rotatably through the elastic support member, and the rotating drum can be balanced so as to rotate in an stabilized state. As a result, an excellent effect can be obtained that sensors or complicated processings for balancing the rotating drum become unnecessary.

By moving a rotation driving means and an image recording means in accordance with the rotating shaft, a rotational force can be applied to the rotating shaft in a stable manner, and an image can be recorded at an appropriate position of the recording material.

What is claimed is:

1. A rotor balancing structure for rotating an object, the structure comprising:

(a) a rotor to which an object can be removably fixed;

(b) a support rotatably supporting the rotor and elastically supporting the rotor so that the rotor may be displaced in a radial direction thereof at the time that the rotor to which the object has been fixed is rotated; and (c) a balancer that can rotate together with the rotor and alter a position of the center of gravity of the balancer, such that a dynamic balance of the overall rotor including the object at the time that the rotor to which the object has been fixed is rotated can be obtained.

2. The rotor balancing structure according to claim 1, wherein the rotor is a drum that includes a drum body, the drum body having:

a central longitudinal axis;

an essentially cylindrical outer circumferential surface concentric to the axis; and shaft sections that are concentric to the axis, integrated with the drum body, and extend in relative directions from each longitudinal side of the drum body.

3. The rotor balancing structure according to claim 2, wherein the support has an annular elastic body surrounding each shaft section for providing elastic radial displacement of the drum.

4. The rotor balancing structure according to claim 2, wherein the balancer includes:

an elastic member mounted to a shaft section; and an annular balancing weight elastically supported via the elastic member, with the elastic member and the balancing weight being rotatable together with the drum.

5. The rotor balancing structure according to claim 2, wherein the balancer includes:

a container mounted at the shaft section, the container being rotatable with the drum and having an annular passage; and a predetermined amount of fluid that is contained in the passage so as to be flowable within the passage.

6. The rotor balancing structure according to claim 2, wherein the balancer includes:

a container mounted at the shaft section, the container being rotatable with the drum and having an annular passage; and at least one weight movably accommodated within the passage.

7. A sheet material processing device, comprising:

(a) a rotatable drum having an outer circumference around which a sheet material can be wound and fixed;

(b) a driving device which rotates the drum when operated;

(c) a support that can support a rotation of the drum and elastically support the drum so that the drum may be displaced in a radial direction thereof at the time that the drum around which the sheet material has been wound and fixed is rotated;

(d) a balancer that can rotate together with the drum and alter a position of the center of gravity of the balancer, such that a dynamic balance of the overall drum including the sheet material at the time that the drum to which the sheet material has been wound and fixed is rotated can be obtained; and (e) a processing element for applying a predetermined processing to the sheet material on the outer circumference of the drum.

8. The device according to claim 7, wherein the processing element includes a recording head for recording an image onto the sheet material.

9. The device according to claim 8, wherein the support has an annular elastic body surrounding each shaft section for providing elastic radial displacement of the drum.

10. The device according to claim 8, wherein the balancer includes:

an elastic member mounted to a shaft section; and an annular balancing weight elastically supported via the elastic member, with the elastic member and the balancing weight being rotatable together with the drum.

11. The device according to claim 8, wherein the balancer includes:

a container mounted at the shaft section, the container being rotatable with the drum and having an annular passage; and a predetermined amount of fluid that is contained in the passage so as to be flowable within the passage.

12. The device according to claim 8, wherein the balancer includes:

a container mounted at the shaft section, the container being rotatable with the drum and having an annular passage; and at least one weight movably accommodated within the passage.

13. The device according to claim 7, wherein at least one of the processing element and the driving device is mounted to a bracket, and the bracket, rather than rotating with the drum, is connected to the drum so as to be able to move in accordance with a radial direction displacement of the drum.

14. The device according to claim 7, wherein the processing element and the driving device are mounted to a same bracket, and the bracket, rather than rotating with the drum, is connected to the drum so as to be able to move in accordance with a radial direction displacement of the drum.

15. The device according to claim 7, wherein the drum has a drum body, the drum body including:

a central longitudinal axis;

an essentially cylindrical outer circumferential surface concentric to the axis; and shaft sections that are concentric to the axis, integrated with the drum body, and extend in relative directions from each longitudinal side of the drum body.

16. An image forming device, comprising:

(a) a rotatable drum having an outer circumference around which a printing plate can be wound;

(b) a driving device which rotates the drum when operated;

(c) a support that can support a rotation of the drum and elastically support the drum so that the drum may be displaced in a radial direction thereof at the time that the drum around which the printing plate has been wound is rotated;

(d) a balancer which can rotate together with the drum and alter a position of the center of gravity of the balancer, such that a dynamic balance of the overall drum including the sheet material at the time that the drum to which the sheet material has been wound and fixed is rotated can be obtained;

(e) a recording device for recording an image onto the printing plate at the outer circumference of the drum; and (f) wherein the driving device and/or the recording device, rather than rotating with the drum, are structured to be able to move in accordance with a displacement of the drum.

17. The device according to claim 16, wherein the drum has a drum body, the drum body including:

a central longitudinal axis;

an essentially cylindrical outer circumferential surface concentric to the axial center; and shaft sections which are concentric to the axis, integrated with the drum body, and extend in relative directions from each longitudinal side of the drum body.

18. The device according to claim 17, wherein the balancer includes:

an elastic member mounted to a shaft section; and an annular balancing weight elastically supported via the elastic member, with the elastic member and the balancing weight being rotatable together with the drum.

19. The device according to claim 17, wherein the balancer includes:

a container mounted at the shaft section, the container being rotatable with the drum and having an annular passage; and a predetermined amount of fluid that is contained in the passage so as to be flowable within the passage.

20. The device according to claim 17, wherein the balancer includes:

a container mounted at the shaft section, the container being rotatable with the drum and having an annular passage; and at least one weight movably accommodated within the passage.

* * * * *